(12) United States Patent
Schick et al.

(10) Patent No.: US 9,798,497 B1
(45) Date of Patent: Oct. 24, 2017

(54) STORAGE AREA NETWORK EMULATION

(71) Applicant: Skytap, Seattle, WA (US)

(72) Inventors: Bradley M. Schick, Seattle, WA (US); Bulat Shelepov, Seattle, WA (US); Nikolai Slioussar, Seattle, WA (US)

(73) Assignee: Skytap, Seattle, WA (US)

( * ) Notice: Subject to any disclaimer, the term of this patent is extended or adjusted under 35 U.S.C. 154(b) by 0 days.

(21) Appl. No.: 15/177,266

(22) Filed: Jun. 8, 2016

Related U.S. Application Data

(60) Provisional application No. 62/172,702, filed on Jun. 8, 2015.

(51) Int. Cl.
| | |
|---|---|
| *G06F 3/06* | (2006.01) |
| *H04L 29/08* | (2006.01) |
| *H04L 12/24* | (2006.01) |
| *G06F 9/44* | (2006.01) |
| *G06F 9/455* | (2006.01) |

(52) U.S. Cl.
CPC .......... *G06F 3/0664* (2013.01); *G06F 3/0619* (2013.01); *G06F 3/0689* (2013.01); *G06F 9/4406* (2013.01); *G06F 9/45558* (2013.01); *H04L 41/08* (2013.01); *H04L 67/1095* (2013.01); *H04L 67/1097* (2013.01); *H04L 67/2842* (2013.01)

(58) Field of Classification Search
CPC .... G06F 3/0655; G06F 3/0689; G06F 3/0604; G06F 3/0685; G06F 2206/1008; G06F 17/30575; G06F 17/30144; G06F 17/30; G06F 9/5011; G06F 2209/5011; G06F 12/00; H04L 63/102
See application file for complete search history.

(56) References Cited

U.S. PATENT DOCUMENTS

| | | | |
|---|---|---|---|
| 8,352,941 B1* | 1/2013 | Protopopov | G06F 9/45558 718/1 |
| 8,756,370 B1* | 6/2014 | Liu | G06F 3/0617 711/114 |
| 8,767,752 B1* | 7/2014 | Tripathi | H04L 47/11 370/401 |
| 8,909,829 B1* | 12/2014 | Thangapalam | G06F 3/0604 710/18 |
| 8,959,287 B1* | 2/2015 | Shajenko, Jr. | G06F 12/109 711/119 |
| 2008/0126580 A1* | 5/2008 | Tripathi | G06F 3/0613 710/5 |
| 2008/0168228 A1* | 7/2008 | Carr | G06F 3/0605 711/117 |
| 2009/0172666 A1* | 7/2009 | Yahalom | G06F 3/0605 718/1 |

(Continued)

*Primary Examiner* — Mano Padmanabhan
*Assistant Examiner* — Jean Edouard
(74) *Attorney, Agent, or Firm* — Perkins Coie LLP

(57) ABSTRACT

Generating a virtual storage area network (VSAN) is disclosed. From the perspective of a customer's virtual machine, the VSAN is a logical network of storage devices that provide features that are typically associated with a physical storage access network, such as block level data storage; logical disk arrays; tape libraries; optical jukeboxes; quality of service; disk mirroring, backup and restoration services; archival and retrieval of archived data; data migration from one virtual storage device to another; sharing of data among different virtual machines in a network; and the incorporation of virtual subnetworks.

46 Claims, 7 Drawing Sheets

(56) References Cited

U.S. PATENT DOCUMENTS

| | | | | |
|---|---|---|---|---|
| 2010/0058335 A1* | 3/2010 | Weber | G06F 9/45533 | 718/1 |
| 2010/0199036 A1* | 8/2010 | Siewert | G06F 3/0613 | 711/112 |
| 2010/0250867 A1* | 9/2010 | Bettger | G06F 17/30587 | 711/152 |
| 2010/0251234 A1* | 9/2010 | Oshins | G06F 9/5077 | 718/1 |
| 2010/0299495 A1* | 11/2010 | Frank | G06F 9/5011 | 711/170 |
| 2010/0306445 A1* | 12/2010 | Dake | G06F 3/0604 | 711/6 |
| 2011/0088030 A1* | 4/2011 | Agesen | G06F 9/4825 | 718/1 |
| 2012/0054746 A1* | 3/2012 | Vaghani | G06F 9/5022 | 718/1 |
| 2012/0089684 A1* | 4/2012 | Angus | H04L 47/22 | 709/206 |
| 2012/0210066 A1* | 8/2012 | Joshi | G06F 12/0866 | 711/118 |
| 2012/0210068 A1* | 8/2012 | Joshi | G06F 9/45558 | 711/122 |
| 2012/0272238 A1* | 10/2012 | Baron | G06F 17/30238 | 718/1 |
| 2012/0304171 A1* | 11/2012 | Joshi | G06F 9/45558 | 718/1 |
| 2012/0330903 A1* | 12/2012 | Periyagaram | G06F 3/0608 | 707/692 |
| 2013/0097377 A1* | 4/2013 | Satoyama | G06F 3/0605 | 711/114 |
| 2013/0326186 A1* | 12/2013 | Shaikh | G06F 11/1435 | 711/170 |
| 2014/0012940 A1* | 1/2014 | Joshi | G06F 9/45558 | 709/214 |
| 2014/0143504 A1* | 5/2014 | Beveridge | G06F 12/0815 | 711/143 |
| 2014/0173213 A1* | 6/2014 | Beveridge | G06F 3/061 | 711/130 |
| 2014/0196037 A1* | 7/2014 | Gopalan | G06F 9/4856 | 718/1 |
| 2014/0244843 A1* | 8/2014 | Cao | H04L 67/322 | 709/226 |
| 2014/0245302 A1* | 8/2014 | Zhu | G06F 9/45558 | 718/1 |
| 2015/0058291 A1* | 2/2015 | Earl | G06F 17/30144 | 707/625 |
| 2015/0058384 A1* | 2/2015 | Karamanolis | G06F 17/30194 | 707/827 |
| 2015/0058535 A1* | 2/2015 | Lasser | G06F 12/0246 | 711/103 |

* cited by examiner

STORAGE AREA NETWORK EMULATION

CROSS-REFERENCE TO RELATED APPLICATION(S)

This application claims the benefit of U.S. Provisional Application No. 62/172,702, filed Jun. 8, 2015, entitled "STORAGE AREA NETWORK EMULATION," which is incorporated herein by reference in its entirety.

BACKGROUND

A data center houses computer systems and associated components, such as servers, storage systems, and virtual computing resources. Communications in data centers are commonly based on networks running the IP protocol suite. Data centers typically contain a set of routers and switches that transport traffic between the servers and to the Internet. Some of the servers at the data center are used for running the basic Internet and intranet services needed by internal users in the organization, e.g., email servers, proxy servers, and DNS servers. Some data centers utilize virtualization in a hosting environment scenario to provide increased services to customers.

A virtual machine (VM) simulates the hardware resources of a physical server. Multiple VMs, each with their own native operating system (OS), can securely run on a single physical server. Hosting VMs in a data center helps bridge the gap between shared web hosting services and dedicated hosting services: this allows one customer's VM to have more independence from other customers' VM implementations, and it costs less than it does to operate dedicated physical servers.

A guest VM operates logically on top of a hypervisor within a physical host system. The hypervisor is a software layer that typically provides virtualization, e.g., virtual versions of computing resources such as physical processors, memory, and peripheral devices. In certain embodiments, the hypervisor may execute on top of a host operating system; in others, it may execute directly (logically) on top of the host hardware ("bare-metal hypervisors").

A storage area network (SAN) is a dedicated network of devices that provide access to consolidated, block-level data storage. SANs are primarily used to enhance storage devices, such as disk arrays, tape libraries, and optical jukeboxes, that are accessible to servers so that the devices appear to be devices locally attached to the operating system. A storage device is commonly associated with how many Input/Output Operations Per Second (IOPS) it can perform for facilitating storage operations from clients (e.g., physical and/or virtual devices).

BRIEF DESCRIPTION OF THE DRAWINGS

One or more embodiments are illustrated by way of example and are not limited to the figures of the accompanying drawings, in which like references indicate similar elements.

DETAILED DESCRIPTION

Figure 1:
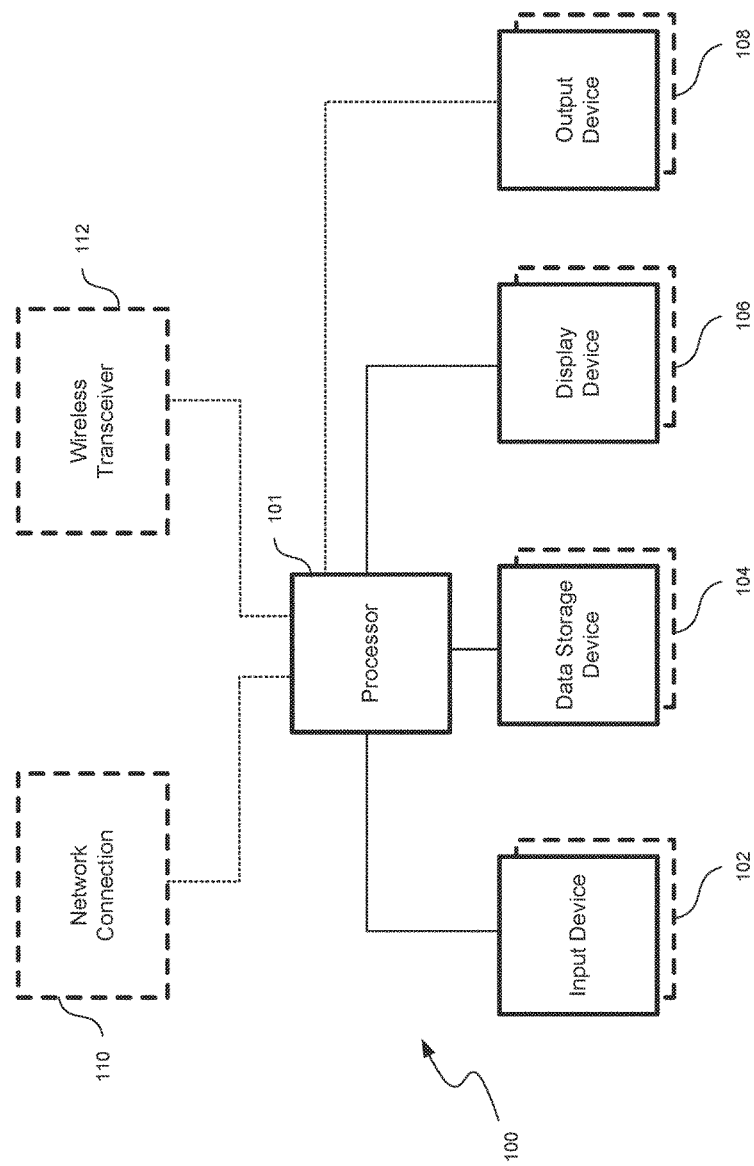
FIG. 1 is a hardware diagram showing components of a typical computer system on which the described technology executes.

In a virtual computing environment, a SAN can be used to provide storage resources to VMs, such as a virtual disk image and data storage space. The inventors have recognized that it is common for traditional SANs to become oversubscribed by VMs. Oversubscribing a SAN occurs when more resources are allocated to the VMs using the SAN than the SAN has available, on the assumption that average actual usage will be less than the allocated resources. An oversubscribed SAN has VMs that can consume more data input/output (I/O) and/or disk space than is available in a SAN and therefore can adversely affect the performance of other VMs that are subscribed to the SAN, including those that are within their subscription limits. The inventors have developed virtual SAN technology that emulates a physical SAN and protects against oversubscribed SANs.

Various embodiments of the technology will now be described. The following description provides specific details for a thorough understanding and enabling description of these embodiments. One skilled in the art will understand, however, that the described technology may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the technology. Certain terms may even be emphasized below; however, any terminology intended to be interpreted in any restricted manner will be overtly and specifically defined as such in this Detailed Description section.

The techniques introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

In some embodiments, the described technology provides a virtual storage area network (VSAN). From the perspective of a customer's VM (and its operator), the VSAN is a logical network of storage devices. The VSAN is configured to provide to VMs various features that are typically associated with a physical SAN. For example, a VSAN can provide consolidated, block-level data storage; logical disk arrays; tape libraries; optical jukeboxes; quality of service; disk mirroring, backup and restore services; archival and retrieval of archived data; data migration from one virtual storage device to another; sharing of data among different VMs in a network; and the incorporation of virtual subnetworks (e.g., including network-attached storage (NAS) systems).

In some embodiments, a VSAN is a virtual machine (VM_SAN) that is communicatively coupled, via a virtual storage transport connection, to a storage pool. A storage pool is an allocation of data storage at a physical block storage device. In various embodiments, the storage pool is formatted to support a file system containing data (e.g., a virtual image and/or other data) for one or more virtual machines, such as a customer VM (VM_C). To the VM_SAN the storage pool appears as a physical storage device (e.g., RAID, hard disk drive, magnetic tape drive, optical driver, magneto-optical disk drive, holographic memory, etc.) and can be accessed by the VM_SAN using traditional technology, e.g., mounting the storage pool using an Open Network Computer Remote Procedure Call protocol, such as a Network Filing System (NFS) share. A single physical block storage device can support multiple VSANs, each VM_SAN having its own virtual storage transport connection to a respective storage pool at that physical block storage device. Because each VM_SAN is limited to a certain level of resources defined by metadata, as described below, VM_Cs subscribed to a VSAN are each prevented (i.e., by the VSAN) from oversubscribing the physical SAN and, moreover, are also prevented from affecting another customer's VSAN that shares that SAN's physical block storage device resources (e.g., CPU usage, disk, data, IOPS, etc.).

In some embodiments, the VSAN is configured to operate based on metadata (or other structured data referred herein as metadata) that defines various attributes of the VSAN and control its operation. For example, metadata can define the size of the storage pool. A storage pool can have at least two size attributes (also referred to herein as "qualifiers") each described in the metadata: a physical size (p_size) and a virtual size (v_size). A physical size is an amount of data that the storage pool is allocated at the physical block storage device. A virtual size is an amount of data that one or more VM_Cs can store in the storage pool. For example, the metadata can include an entry (e.g., v_size=100 GB) to allocate to a customer (i.e., to the customer's VM_Cs) up to 100 GB of the storage pool's allotted 200 GB (i.e., p_size=200 GB). In various embodiments, a v_size can exceed a p_size. Configuring a v_size greater than a p_size can be useful to take advantage of any unallocated space available at a VM_SAN (i.e., storage space at a storage pool that is not actively being used by other VM_Cs subscribed to that VM_SAN), while still preventing oversubscription of the physical SAN. If a VM_C attempts to use more storage space a storage pool's p_size, the VM_SAN can prevent or allow VM_C's storage requests. For example, a VM_C configured with a v_size of 300 GB can store up to 200 GB of data at a storage pool having a 200 GB p_size. In one or more embodiments, if all of a storage pool's 200 GB p_size is already allocated (e.g., to other VM_Cs) and the VM_C attempts to store data in excess of the 200 GB p_size, the VM_SAN is configured with logic to prevent the VSAN from sending storage requests that may oversubscribe the physical SAN. In other words, VSANs can be oversubscribed by their respective VM_Cs without the oversubscribing the underlying physical SAN. In some embodiments, if a VM_C attempts to store data in excess of a storage pool's p_size, the described technology can notify the customer and/or provision additional p_size storage space at a SAN and/or request storage space at a new or different storage pool subscribed to the same VSAN, without oversubscribing the physical SAN. Techniques for increasing v_size and p_size and notifying customers are further described below.

In some embodiments, metadata defines a rate (i.e., based on an input/output (I/O) per-second (IOPS) rate) at which data is sent to a storage pool. A virtual storage transport connection is a logical network abstraction of a physical link (e.g., electrical and/or optical-based link, such as Fiber Channel) used to send data between the physical block storage device that hosts the storage pool and one or more physical servers that host the VM_SAN. For example, a VM_SAN can send, via the virtual transport connection, a storage device access request (e.g., a disk read/write/delete/format/append/modify/instruction/etc.) to perform an operation at the storage pool. The virtual storage transport connection's available bandwidth and/or virtual input/output (I/O) data rate per second (v_IOPS), e.g., are determined based on one or more data entries in the metadata. For example, a physical block storage device has a real IOPS (e.g., a manufacturer-determined IOPS, such as 7,500); however, the metadata can include an entry (e.g., text, indicia, data entry, or reference to external data (e.g., a database)) that limits the IOPS (e.g., IOPS_limit=1,000) to a value equal to or less than the real IOPS for sending data via a virtual storage transport connection to the storage pool at the physical block storage device. A operating system of the VM_SAN configures the virtual storage transport connection to conform with the metadata (e.g., v_IOPS). In various embodiments, a network controller in the VM_SAN is configured based on the metadata to dynamically adjust the rates at which data is sent to the storage pool. For example, the described technology can use various techniques such as traffic shaping (also known as metering or packet shaping) to adjust storage operation requests from using a first IOPS rate (i.e., a first v_IOPS rate) to using a second IOPS rate (i.e., a second v_IOPS rate). Traffic shaping is a network traffic management technique which, for example, delays some or all network packets (i.e., packets that contain portions of a storage operation request) to bring them into compliance with a desired profile (e.g., the IOPS_limit). In various embodiments, the network controller is configured to delay storage operation requests such that each packet complies with a traffic contract, as defined by one or more entries (e.g., the IOPS_limit) in the metadata. Traffic shaping may be implemented with, for example, a leaky bucket, token bucket algorithm, or other techniques known in the art. Metered packets, in one or more embodiments, are then stored in a buffer until they can be transmitted in compliance with the prevailing traffic contract, as defined in the metadata. This may occur immediately (if the traffic arriving at the network controller is already compliant), after some delay (i.e., waiting in the buffer until its scheduled release time), or never (in case of buffer overflow). A VM_SAN can use various buffering techniques to buffer the packets in the network controller, such as FIFO, differentiated services, weighted round robin, random early detection, port queue buffering, and other techniques known in the art.

In one or more embodiments, an operator (e.g., a VSAN storage provider and/or automated technology) determines the initial metadata entries for a new VSAN, such as the v_IOPS and the IOPS_limit for the storage pool. The described technology, in various embodiments, then determines, e.g., the initial p_size of the new VSAN. Unless overridden by the operator, this is generally a fixed value, minimally sufficient for initial customer workloads (e.g., 10 GB). The described technology reserves an initial allocation of p_size at the physical block storage device and, consequently, the amount of available physical space on the physical block storage device is reduced by p_size. The VM_SAN that runs the VSAN's operating system, in one or more embodiments, is initially determined by the operator. Multiple preconfigured VM_SANs can be used by the described technology to quickly provide an available running VM_SAN for a new VSAN.

An operator can choose from various operating system types for the new VM_SAN, such as a commodity operating system and/or commercially mass-produced operating system (e.g., Windows or Linux) that can be configured to operate in a VSAN (e.g., configured based on metadata). The operator can also select the desired RAM size, CPU number, etc. for the new VM_SAN. The new VM_SAN is instantiated and started on a computing device (i.e., a virtual machine provider that hosts the VM_SAN), assigned network configurations (e.g., an IP address), and remotely booted (i.e., the chosen operating system is booted) by a remote operating system boot provider, such as a PXE server. The described technology instructs the new VM_SAN (i.e., the VM_SAN's operating system) to create a logical file system on the physical block storage device and configures the virtual machine provider to limit the new VM_SAN (i.e., the VM_SAN's operating system) to sending no more than the IOPS_limit I/O operations (e.g., a read or write operation) over the virtual storage transport per second.

In various embodiments, the described technology modifies metadata to automatically provision or re-provision a VSAN. For example, to increase a customer's storage space from, e.g., 100 GB to 1 TB and to make that 1 TB accessible at a rate increased from, e.g., 500 IOPS to 1,000 IOPS, entries (e.g., v_space=1 TB; IOPS_limit=1,000) in the metadata can be modified by the described technology. A request to modify the metadata can originate from a customer. In some embodiments, the customer can access a graphical user interface (a dashboard) that displays resources allocated to the customer's VM_Cs. For example, a VM_C can be configured with, among other things, a virtual machine name, a number of CPUs, a RAM size, an operating system type, a disk size (i.e., v_size), and a disk's virtual IOPS limit (e.g., v_IOPS). The customer can request (e.g., via button, scroll bar, text entry, indicator, voice command, etc.) a new entry, for example, to increase the disk's IOPS_limit from, e.g., 500 IOPS to 1,000 IOPS. This request can cause a corresponding update in the metadata. The VSAN can automatically and/or periodically review the metadata for modifications and, in response, provision the VSAN accordingly. The customer can be charged fees for provisioning and/or re-provisioning a VM_C's resources at the VSAN. For example, a customer can be presented with a GUI, email, SMS, voicemail, or other electronic delivery method to request that the customer purchase additional storage space and/or IOPS.

Logically, the new VSAN is indistinguishable from existing physical storage nodes and is accessed in the same way (e.g., clients mount NFS shares exposed by the storage node). To create a new VM_C, the VM_SAN can create or clone a new dataset on the storage pool's file system that is exposed as a client-accessible share (e.g., a NFS share). The VM_C is instantiated on the storage pool file system and is configured by the described technology to use the client-accessible share (e.g., the NFS share) as the backend store for its virtual disk images. When the VM_C reads and writes data to its virtual disks all I/O passes through the VM_SAN that is configured, based on the metadata, to the storage pool's I/O rates (i.e., IOPS_limit), therefore the VM_C cannot produce more than IOPS_limit I/O operations (e.g., read and write operations) that reach the storage pool per second. A customer can access the customer's VM_C via standard networking technology, such as secure shell host (SSH) and remote desktop protocol (RDP) technologies. Access to a VSAN via a VM_C is determined by the VSAN's current configuration (i.e., how the VSAN is provisioned based on at least the metadata), as described above. For example, a customer's VM_C may have a current available storage of 1 TB as defined in the storage pool's metadata (i.e., v_space=1 TB). Attempts to store more than a storage pool's allocated capacity, in some embodiments, will result in an error (e.g., "Disk limit reached") or other notification to the customer. In various embodiments, a VM_C's storage access requests are received by the virtual machine provider via the client-accessible share exposed by the VM_SAN. As described above, the VM_SAN cannot produce more IOPS I/O operations than the IOPS_limit defined in the metadata for the VM_SAN. For example, when a VM_C sends write requests at 1,000 IOPS to the storage pool, the VM_SAN determines whether the IOPS rate of the request exceeds the VSAN's IOPS_limit for sending the request to the storage pool. If the IOPS rate of the request exceeds the threshold, the described technology throttles (meters) the request to an IOPS rate within the threshold IOPS limit, based on one or more traffic shaping techniques. For example, if an IOPS_limit for a VSAN is 750 IOPS and a VM_C's write requests are received at the VM_C at 1,000 IOPS, then the VSAN (i.e., the VM_SAN's network controller) will detect that the requests exceed the 750 IOPS_limit and, in some embodiments, will automatically limit the IOPS to within the IOPS_limit by, for example, delaying (e.g., based on a timer and/or queue position) sending each of the write requests to the storage pool. In some embodiments, IOPS thresholds are based on the type of the storage operation request sent to the storage pool (e.g., random read requests, random write requests, sequential read requests, and sequential write requests). Prioritizing IOPS based on a type of storage operation requests can be important when, for example, the VSAN has limited resources available for critical applications (e.g., a backup service).

Multiple VM_Cs can share the same VSAN storage pool and, together, the VM_Cs are limited, via the VM_SAN, to the IOPS limit (i.e., IOPS_limit) defined in the metadata for that VSAN. In some embodiments, a VM_C has its own IOPS limit (i.e., a per-VM_C IOPS limit). This is similar to a VM_SAN-based IOPS limit, described above; however, a per-VM IOPS limit is an IOPS rate limit for an individual VM_C accessing the VSAN. Separate VM_C IOPS limits can be important when multiple VM_Cs are using the same VSAN and one or more of the VM_Cs should receive prioritization (e.g., a priority given to system administrators VM_C over a less critical VM_C). When, for example, the combined IOPS rate of a first VM_C's storage operation requests and a second VM_C's storage operation requests exceed an IOPS threshold for the VSAN, the described technology can limit the IOPS for one or both of the VM_Cs. IOPS rates, in various embodiments, can be split (e.g., based on a percentage) between the VM_Cs and can be prioritized based on a type of storage operation request, data accessed at the storage pool, amount of time a respective VM_C has accessed the storage pool, and various other characteristics.

In various embodiments, the VSAN provides efficient storage technologies to maximize the number of VM_Cs using a storage pool. For example, ten separate VM_Cs may require 100 GB each (i.e., a total of 1 TB) of a storage pool's available storage space. If the storage pool has a p_size of 500 GB, e.g., then only five of the ten VM_Cs could use the storage pool, because these five VM_Cs would together completely consume the 500 GB p_size of the storage pool. In one or more embodiments, a VM_C can leverage a first VM_C's block storage data at a storage pool. For example, a customer may want to substantially duplicate one VM_C's configurations (e.g., OS, RAM, p_size, v_size, IOPS limit, network configuration) for use by one or more other VM_Cs on a VSAN. To minimize the storage space required for each of the secondary VM_Cs (e.g., the five VM_Cs that cannot fit on the 500 GB p_size), the described technology uses copy-on-write technology that allows a VSAN to operate one or more of the secondary VM_Cs from a first VM_C's physical block storage data. When a secondary VM_C generates data unique from the block storage of the first VM_C (e.g., a file is create or modified), the VSAN, in some embodiments, writes that data to a new block storage space (e.g., a block storage space separate from the first VM_C's block storage space). To a customer, each VM_C appears to have its own configurations and storage space, however, the p_size for the host storage pool only needs to have enough capacity to store the first VM_C's block storage requirements plus any delta data generated by each of the other VM_C. Other technologies, such as deduplication, compression, caching, and encryption provide additional and/or alternative embodiments to increase storage space efficiency and security.

FIG. 1 and the following discussion provide a brief, general description of a suitable computing environment in which aspects of the described technology can be implemented. Although not required, aspects of the described technology may be described herein in the general context of computer-executable instructions, such as routines executed by a general or special-purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the described technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (packet-switched, circuit-switched, or other scheme).

The described technology can also be practiced in distributed computing environments where tasks or modules are performed by remote processing devices, which are linked through a communications network, such as a local area network (LAN), wide area network (WAN), or the Internet. In a distributed computing environment, program modules or sub-routines may be located in both local and remote memory storage devices. Those skilled in the relevant art will recognize that portions of the described technology may reside on a server computer, while corresponding portions reside on a client computer (e.g., PC, mobile computer, tablet, or smart phone). Data structures and transmission of data particular to aspects of the described technology are also encompassed within the scope of the described technology.

Referring to FIG. 1, the described technology employs a computer 100, such as a personal computer, workstation, phone, or tablet, having one or more processors 101 coupled to one or more user input devices 102 and data storage devices 104. The computer 100 is also coupled to at least one output device such as a display device 106 and one or more optional additional output devices 108 (e.g., printer, plotter, speakers, tactile or olfactory output devices, etc.). The computer 100 may be coupled to external computers, such as via an optional network connection 110, a wireless transceiver 112, or both. For example, network hubs, switches, routers, or other hardware network components within the network connection 110 and/or wireless transceiver 112 can couple one or more computers 100.

The input devices 102 may include a keyboard and/or a pointing device such as a mouse. Other input devices are possible, such as a microphone, joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet (not shown in FIG. 1).

Figure 2:
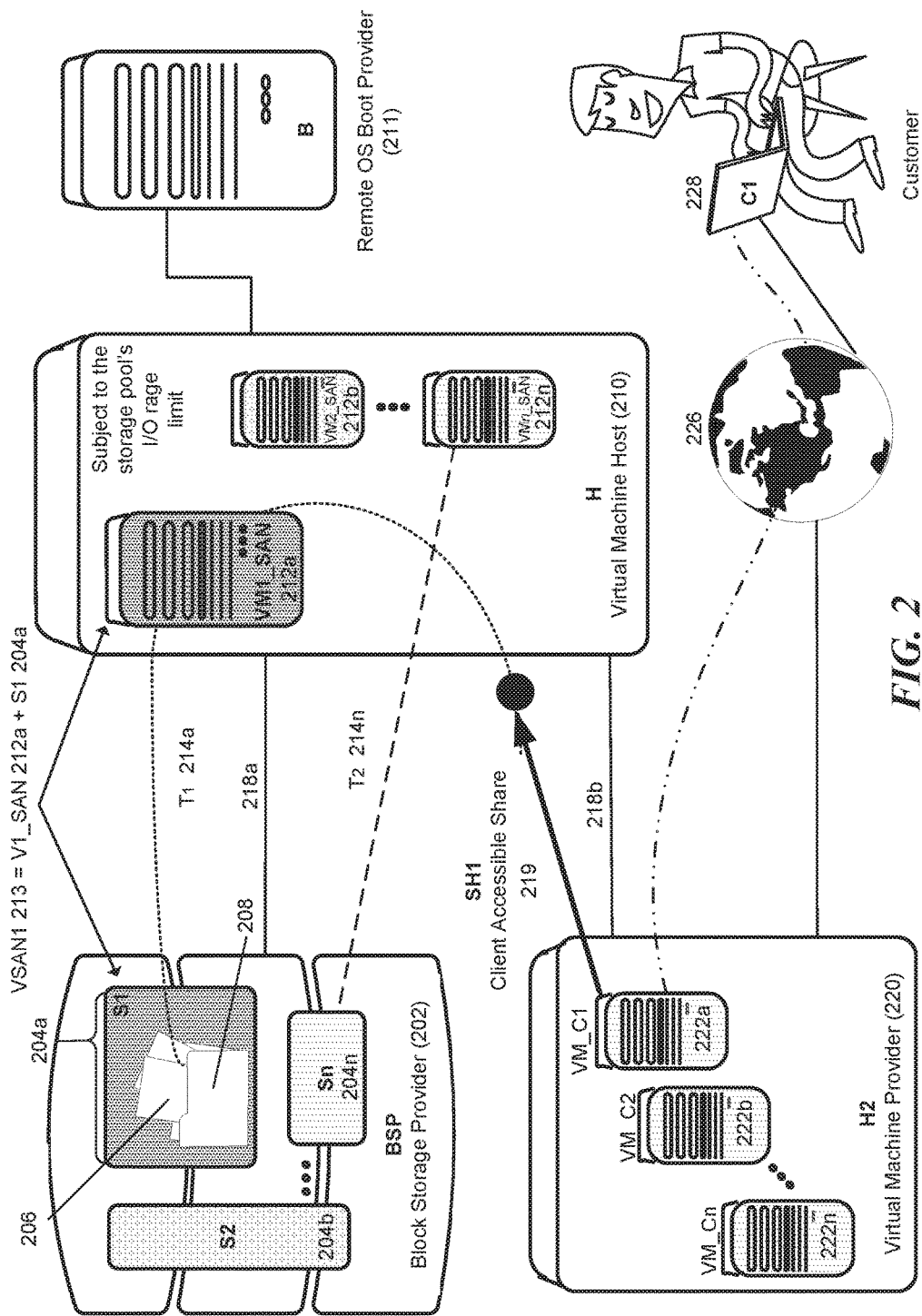
FIG. 2 is a network diagram showing an example of a virtual storage area network in which aspects of the described technology operate.

Aspects of the described technology may be practiced in a variety of other computing environments. For example, referring to FIG. 2, VSAN network 200 is one implementation of a VSAN, e.g. VSAN1 213, capable of implementing features of the described technology. FIG. 2 includes Block Storage Provider 202 (i.e., a physical block storage device), Virtual Machine Host 210, Remote OS Boot Provider 211, Virtual Machine Provider 220, Customer Computing Device 228, and a network 226. Block Storage Provider 202 includes Storage Pools 204a-204n, and each Storage Pool 204a-204n can include a File System 208 with Data 206. Virtual Machine Host 210 includes Virtual Machines VM1_SAN 212a, VM2_SAN 212b, and VMn_SAN 212n. Virtual Machine Host 210 is communicatively coupled, via a wired or wireless Link 218a ((e.g., WiFi or a wired technology, such as an electrical and/or optical-based link (e.g., Fiber Channel)), to Block Storage Provider 202. Virtual Storage Transport Connections T1 214a-Tn 214n are logical network abstractions of Link 218a used by the described technology to meter data IOPS sent between VM1_SAN 212a-VMn_SAN 212n and Block Storage Provider 202, based on the configuration of the respective Storage Pools 204a-204n.

Remote OS Boot Provider 211 (e.g., a Preboot Execution Environment (PXE) server), in various embodiments, is connected to Virtual Machine Host 210 (e.g., a computing device, such as a server, having processing power, memory, disk(s), and network I/O). Remote OS Boot Provider 211 is configured to boot respective operating systems (e.g., a commodity, Windows®, Linux®, or other customizable operating system) on each of VM1_SAN 212a-VMn_SAN 212n. Virtual Machine Provider 220 is a physical computing device (e.g., a computing device having resources similar to Virtual Machine Host 210) that hosts customer virtual machines VM_C1 222a-VM_Cn 222n. Virtual Machine Provider 220 is communicatively coupled to Virtual Machine Host 210 via Link 218b (e.g., wireless or wired electrical and/or optical-based link, such as Fiber Channel). A client accessible share SH1 219 exposed by a VM_SAN (e.g., VM1_SAN 212a) provides a VM_C (e.g., VM_C 222a) network access, via Links 218a-218b, to data (e.g., Data 206) on a storage pool (e.g., Storage Pool S1 204a. Various technologies are used by the described technology to provide network access to e.g., S1 204a-S2 204n, such as providing a NFS share. Other network-based technology can also be used with the described technology, such as an Open Network Computer Remote Procedure Call mounting protocol to the physical blocks reserved for the storage pool at the Block Storage Provider 202.

As mentioned above, the IOPS rate at which a customer virtual machine (e.g., VM_C1 222a-VM_Cn 222n) can access a storage pool (e.g., S1 204a-Sn 204n) is based on each respective storage pool's corresponding VM_SAN (e.g., VM1_SAN 212a-VMn_SAN 212n). A customer at Computing Device 228 (e.g., a computer, laptop, desktop, mobile device, tablet computer, web browser, smart glasses, smart watch, etc.) accesses the customer's Virtual Machine (e.g., VM_C1 222a) via network 226 (e.g., the Internet or a local area network). In one example, a customer operates Computing Device 228 to access Data 206 at VSAN1 213 (i.e., Data 206 on SP1 204a is available to VM_C1 222a via Links 218a-b and as governed by VM1_SAN 212a). The customer, via Computing Device 228, sends a request (e.g., a request for Data 206) to VM_C1 222a to access Data 206. In one or more embodiments, VM_C1 222a sends storage access requests (e.g., read requests) via the NFS share SH1 219 to VM1_SAN 212a. VM_SAN 212a can, in various embodiments, perform VSAN1 213-specific operations in response to receiving the storage access requests, such as referencing one or more entries 704a-704n in Metadata 700 (FIG. 7) to meter (i.e., slow down or speed up) an IOPS rate at which the storage access requests are sent to S1 204a, as described above. For example, if VSAN1 213 is configured to limit IOPS to under 2,000 IOPS, a customer's storage access requests sent at a rate of 2,500 IOPS are metered by the VM1_SAN's 212a network controller such that the IOPS rate that VM1_SAN 212a sends each of the requests does not exceed 2,000 IOPS when the requests reach Block Storage Provider 202. In various embodiments, one metadata entry, e.g., one of entries 704a-704n, determines how a group of customer VMs, i.e., VM_C1-VM_Cn, access S1 204a, for example.

Figure 3:
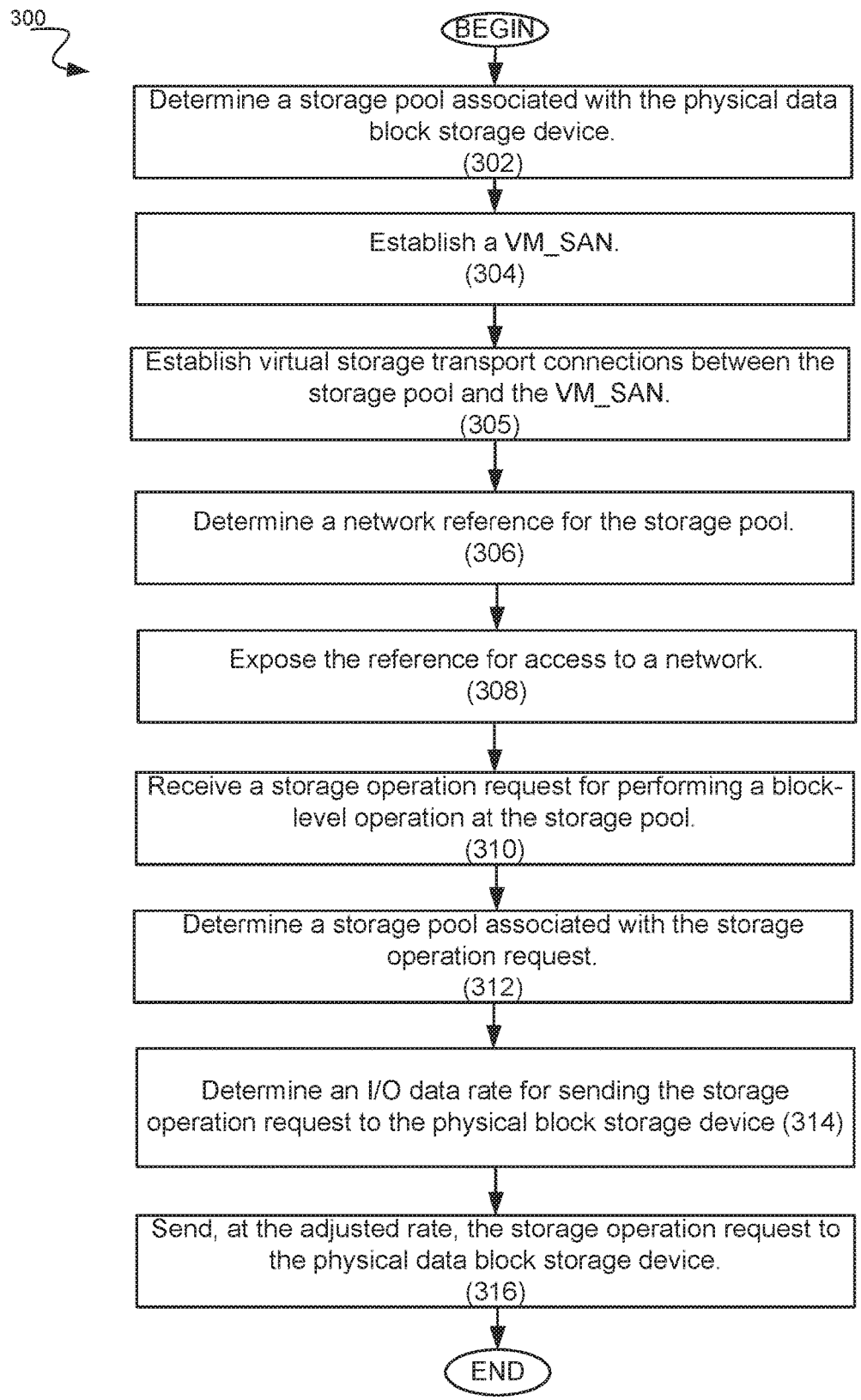
FIG. 3 is a flow diagram depicting a simple, yet suitable system in which aspects of the described technology may operate.

FIG. 3 is a flow diagram 300 depicting a simple, yet suitable system in which aspects of the described technology may operate. Flow diagram 300 depicts steps 302-316 for creating a new VSAN (e.g., VSAN 213) and sending storage operation requests to the VSAN's storage pool (e.g., S1 204a) via a network share (e.g., SH1 219). Flow diagram 300 begins at step 302. The described technology establishes, at step 302, a storage pool (e.g., S1 204a) at a physical block storage device (i.e., Block Storage Provider 202). For example, in one or more embodiments, metadata (i.e., Metadata 700) is referenced by the described technology to determine a physical size (i.e., a p_size 704a) for reserving an initial allocation of space at the physical block storage device for the new VSAN. At step 304, the described technology establishes a new VM_SAN (e.g., VM1_SAN 212a). In one or more embodiments, the new VM_SAN is configured (e.g., an operator chooses the amount of RAM, CPUs, disk space, etc. for the VM_SAN), instantiated, and started on the virtual machine provider. An IP address is assigned to the VM_SAN and the VM_SAN is remotely booted by a remote operating system boot provider (i.e., Remote OS Boot Provider 211). The described technology instructs the VM_SAN's operating system to create a logical file system on the physical block storage device and configures the VSAN to limit the VM_SAN to sending no more than the IOPS_limit I/O operations to the storage pool per second.

At step 305, a virtual storage transport connection (e.g., T1 214a) is established between the VM_SAN and the physical block storage device. The virtual transport connection allows the VM_SAN to detect S1 204 as a mass storage device of size p_size and perform block-level read, write, and seek operations on it. At step 306, the described technology determines a network reference SH1 219 (e.g., an NFS share) for accessing S1 204a and, at step 308, exposes the reference (e.g., the NFS share) for access via one or more customer virtual machines (e.g., VM_C1 222a-VM_Cn 222n). For example, during steps 302-306 the described technology can establish and format S1 204a with a file system (e.g., File System 208) that contains data (e.g., Data 206, such as a virtual image, virtual disk, customer information, Metadata 700, and other data and data types). In some embodiments, the VM_SAN (e.g., VM1_SAN 212a) detects the storage pool (e.g., S1 204a) as a mass storage device (i.e., a physical storage device). The VM_SAN (e.g., VM1_SAN 212a) exposes the mass storage device as a network share (e.g., SH1 219). The network share SH1 219 (e.g., an NFS share) makes File System 208 and Data 206 accessible to, for example, one or more customer virtual machines (e.g., VM_C1 222a-VM_Cn 222n).

At step 310, the described technology receives information (e.g., storage operation requests) for performing block-level operations at the storage pool (e.g., S1 204a). For example, VM_C1 222a sends requests to, for example, write data to File System 208. VM1_SAN 212a receives the write requests via SH1 219, and in some embodiments, at step 312, determines which of one or more storage pools is associated with the write requests, if there is more than one storage pool S1 204a-Sn 204n associated with the File System 208, as described below. The described technology, at step 314, determines whether there are any storage pool qualifiers (e.g., an entry 704a-704n in Metadata 700) associated with the requested storage pool (e.g., S1 204a). For example, if S1 204a is associated with an IOPS_limit (e.g., 2,000 IOPS 704c), the described technology can meter (e.g., slow down) the IOPS rate at which the write requests are sent to Block Storage Provider 202. In some embodiments, VM1_SAN 212a can adjust (e.g., slow down or speed up) storage request IOPS rates by, for example, storing the requests (or portions of the requests, e.g., one or more data packets) in a network queue for a determined period of time, adjusting a TCP window size, and/or other traffic shaping techniques (e.g., the traffic shaping techniques described above) for sending one or more of the storage requests to the storage pool. At step 316, the described technology sends, via T1 214a, the storage requests at the metered rate (e.g., 2,000 IOPS 704c) for execution at Block Service Provider 202.

Figure 4:
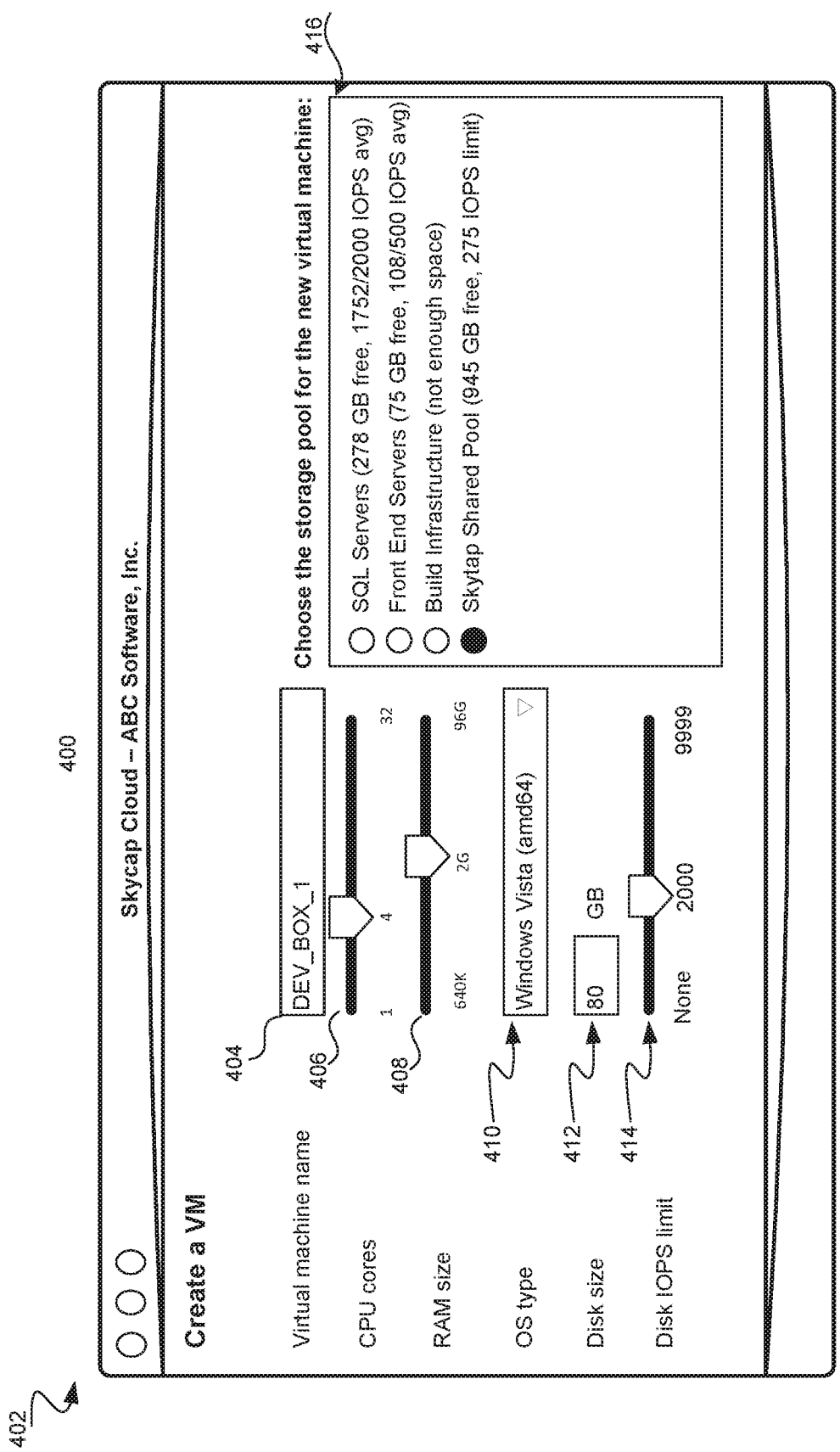
FIG. 4 is a user interface diagram showing an example of a visual user interface for creating a virtual machine to access a storage pool.

FIG. 4 is a user interface diagram 400 showing an example of a graphical user interface (GUI) 402 for creating a virtual machine (e.g., VM_C1 222a) that accesses data (e.g., Data 206) at a storage pool (e.g., S1 204a). Using GUI 402, the customer can create a virtual machine (e.g., VM_C1 222a) having one or more defined configurations. For example, a customer can configure VM_C1 222a, for example, to have a Virtual Machine Name 404 (e.g., "Dev_Box_1"), CPU Cores 406 (e.g., "4" cores), RAM 408 (e.g., ~2 GB), an operating system type 410 (e.g., "Windows Vista (amd64)"), and a disk size 412 (e.g., an "80" GB v_size 704b at S1 204a). Additionally, the customer can configure an IOPS rate limit 414 (e.g., "200") at which information can be sent for delivery from, e.g., VM_C1 222*a* to S1 204*a*. Component 416 has technology to allow a customer to choose a storage pool (e.g., S1 204*a*) for the new virtual machine (e.g., VM_C1 222*a*). For example, the customer can select from various storage pools based on a respective storage pool's available space (e.g., based on its v_size 704*b*) and/or its IOPS limit (i.e., its IOPS_limit 704*c*). Non-limiting examples include the SQL Servers storage pool, which has 278 GB available and is using 1,752 out of 2,000 IOPS on average, and the Front End Servers storage pool, which has 75 GB available and is using 108 out of 500 IOPS on average. Some storage pools may be unavailable. For example, Build Infrastructure storage pool does not have enough available space to support a new virtual machine (e.g., VM_C1 222*a*). In some embodiments, a storage pool is shared. For example, storage pool Skytap Shared Pool is available to multiple virtual machines VM_C1 222*a*-VM_Cn 222*n*, e.g., for the same or different customers.

In some embodiments, a VSAN, e.g., VSAN1 213, is a single storage pool, e.g., S1 204*a*, that is associated with a single VM_VSAN (e.g., VM1_SAN 212*a*). For example, a first VSAN is an association of S1 204*a* with VM1_SAN 212*a*; a second VSAN is an association of S2 204*b* with VM2_SAN 212*b*; and an nth VSAN is an association of Sn 204*n* with VMn_SAN 212*n*. In various embodiments, multiple storage pools S1 204*a*-Sn 204*n* are accessible by a single VM_VSAN (e.g., VM1_SAN 212*a*) to, for example, increase the v_size 704*b* over a p_size 704*a* that is allocated to a single storage pool (e.g., S1 204*a*). This may be desirable when a customer wants to purchase more storage space on the same VSAN, e.g., S1 204*a*. A storage pool size (i.e., p_size 704*a*) can be increased in at least two ways. In one or more embodiments, extending both the initial block storage allocation for S1 204*a* on the Block Storage Provider 202 and the File System 208 expands the capacity of S1 204*a*. Alternatively or additionally, a new storage pool (e.g., Sn 204*n*) is established on the same or a different Block Storage Provider 202 as S1 204*a*. A new virtual transport connection (e.g., T3 (not shown)) is determined by VM1_SAN 212*a* to support communication between Sn 204*n* and VM1_SAN 212*a*. VM1_SAN 212*a* detects Sn 204*n* as a new mass storage device and adds the new mass storage device to the logical File System 208.

Figure 5:
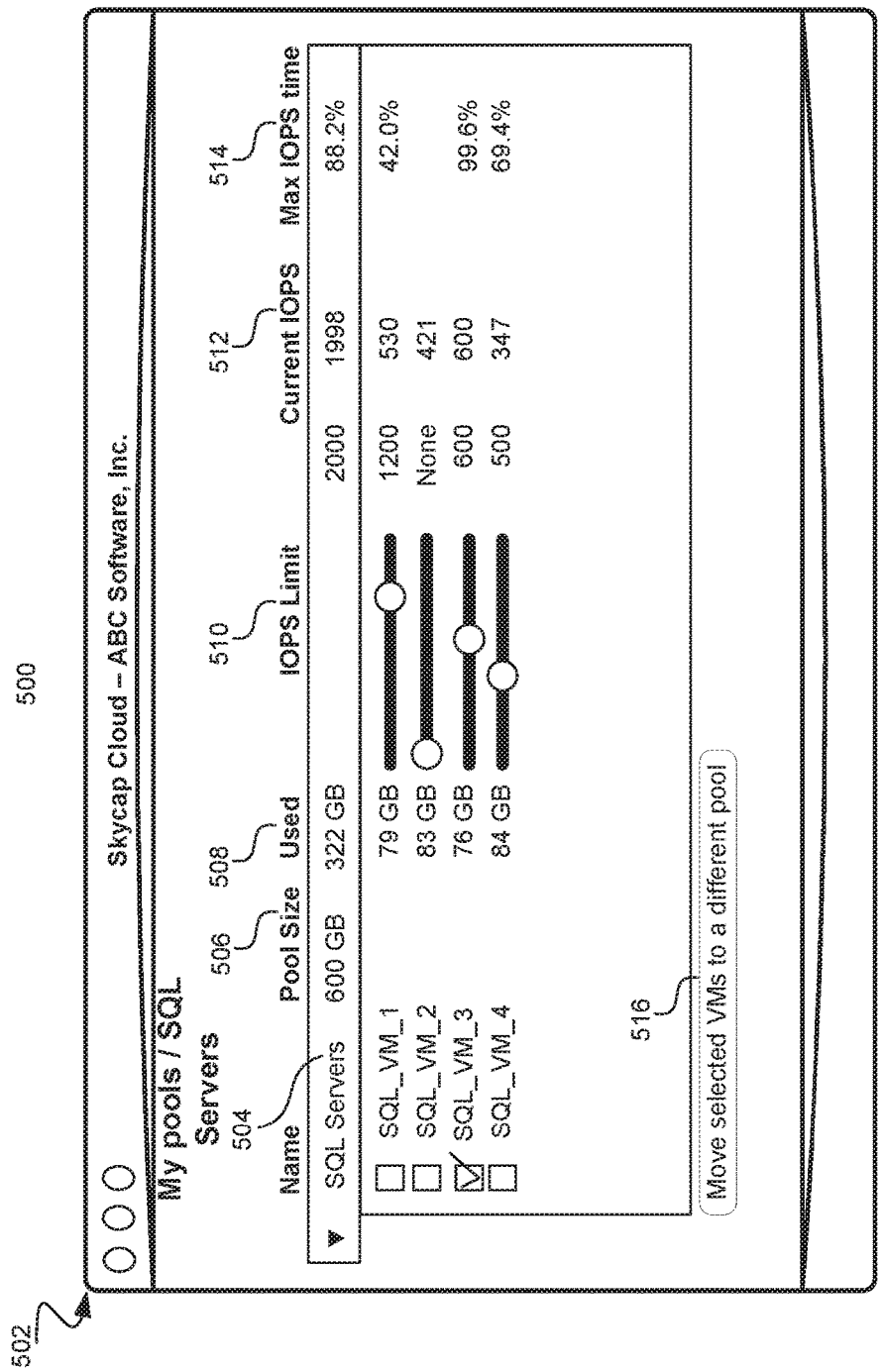
FIG. 5 is a user interface diagram showing an example of a visual user interface for allocating resources to a storage pool.

FIG. 5 is a user interface diagram 500 showing an example GUI 502 for managing multiple customer VMs (e.g., VM_C1 222*a*-VM_Cn 222*n*) that access a single storage pool (e.g., S1 204*a*). GUI 502 displays a customer's active pools 504 and their respective resource allocation 506-514. GUI 502 depicts that the SQL Servers Storage Pool 504 includes customer VMs SQL_VM_1, SQL_VM_2, SQL_VM_3, and SQL_VM_4. For each customer VM (e.g., VM_C1 222*a*-VM_Cn 222*n*), GUI 502 depicts how a respective customer VM (e.g., VM_C1 222*a*) is utilizing SQL Servers storage pool resources. In one or more embodiments, a storage pool resources include, e.g., a storage pool size 506 (e.g., 600 GB), the amount of space currently used 508 (e.g., 322 GB), an IOPS limit 510 (e.g., 2,000) for the storage pool 504, the current IOPS 512 used by the storage pool 504, and the percentage of maximum IOPS time 514 used by each VM_C1 222*a*-VM_Cn 222*n*. As depicted in GUI 502, the customer has selected (i.e., indicated by a checkmark) the SQL_VM_3 storage pool. SQL_VM_3 is currently using ~600 IOPS, which is consuming nearly all (e.g., 99.6%) of the IOPS available to SQL_VM_3. As further depicted in FIG. 6, a customer can purchase more IOPS for SQL_VM_3 (e.g., by increasing SQL Servers storage pool's v_size). IOPS limits for SQL_VM_1, SQL_VM_3, and SQL_VM_3 are each based on a per-virtual machine basis (e.g., SQL_VM_1 is limited to 1,200 IOPS, SQL_VM_3 is limited to 600 IOPS, and SQL_VM_4 is limited to 500 IOPS); however, in other embodiments, per-virtual machine IOPS limits are optional (e.g., SQL_VM_2 is not IOPS limited). Increasing an IOPS limit for a virtual machine, e.g., SQL_VM3, may slow down other virtual machines (e.g., SQL_VM_1, SQL_VM_2, and SQL_VM4) due to a cumulative per pool limit; however, other customers' VM will not be affected. The total per-virtual machine IOPS limit, in some embodiments, can exceed the p_size so that a storage pool's IOPS are fully utilized.

Each respective storage pool S1 204*a*-Sn 204*n* is limited to its own p_size; therefore, a customer accessing a storage pool, e.g., S1 204*a*, on Block Storage Provider 202 is not affected by an over-allocation of space to other customers (e.g., at Block Storage Provider 202, a space allocated for VM_C1 222*a* is isolated from a space allocated for, e.g., VM_C2 222*b*). In some embodiments, one or more virtual machines VM_C1 222*a*-VM_Cn 222*n* can be moved (e.g., by activating indicator 516) to a different storage pool (e.g., from S1 204*a* to S2 204*b*) to, for example, efficiently distribute resources (e.g., size and IOPS) used by the one or more virtual machines VM_C1 222*a*-VM_Cn 222*n*.

Figure 6:
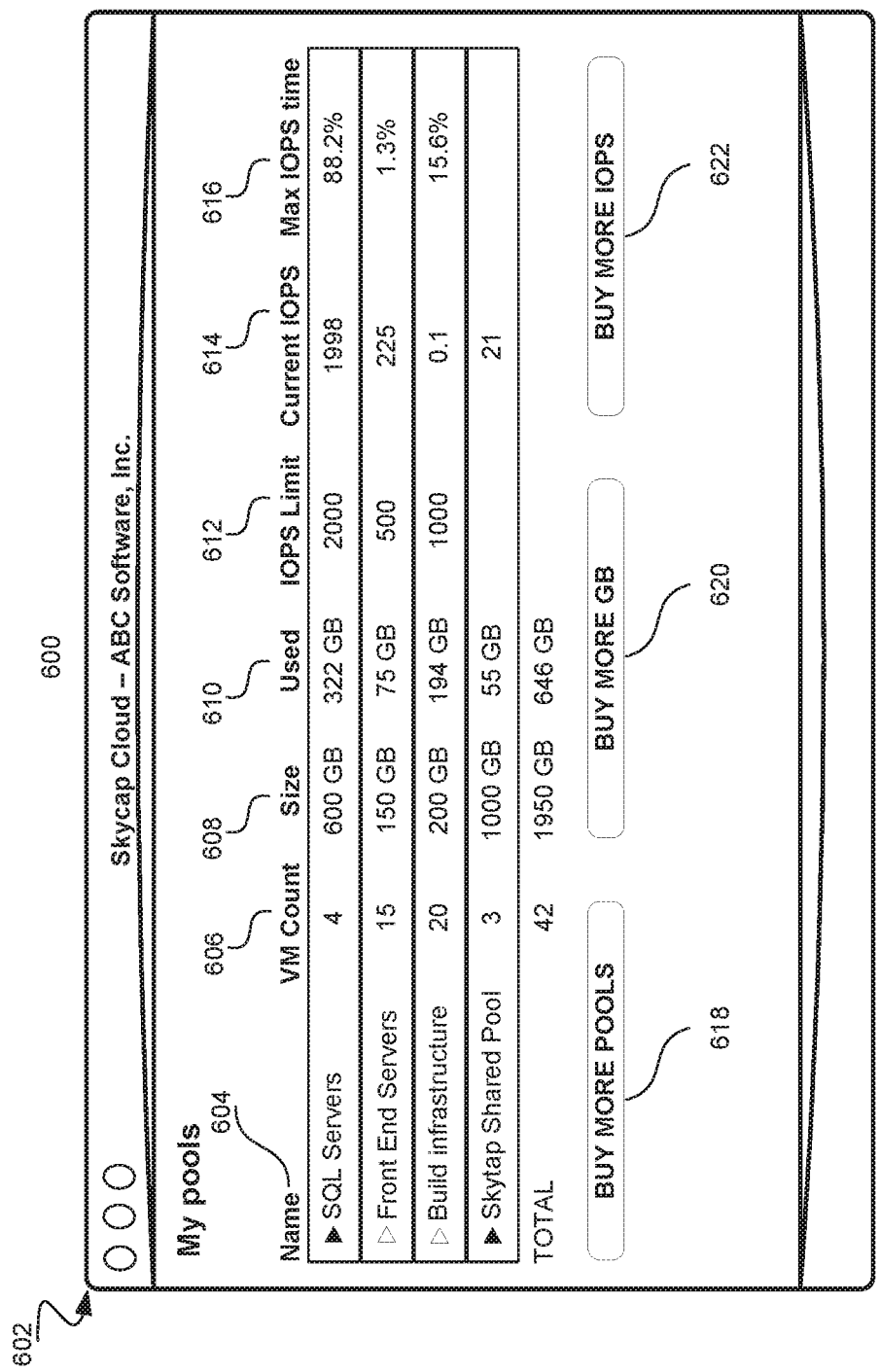
FIG. 6 is a user interface diagram showing an example of a visual user interface for managing multiple storage pools.

FIG. 6 is a user interface diagram 600 depicting an example of a GUI 602 for managing multiple storage pools S1 204*a*-Sn 204*n*. GUI 602 allows a customer to manage one or more storage pools by name 604 (e.g., SQL Servers, Front End Servers, Build infrastructure, and Skytap Shared Pool) to modify various storage pool attributes, such as, e.g., a VM Count 606, storage pool size 608, current storage used 610, IOPS limit 612, current IOPS 614, and maximum IOPS time 616. For example, GUI 602 depicts that the SQL Servers storage pool includes four virtual machines (e.g., VM_C1 222*a*-VM_Cn 222*n*), a p_size of 600 total gigabytes (of which 322 gigabytes are used), and an IOPS_limit of 2,000 (of which 1,998 IOPS are currently being used) that is 88.2% of the current IOPS limit for the SQL Servers storage pool. GUI 602 allows a customer, via graphical indicators 618-622 (or other input means) to buy more storage pools, buy more storage space, and buy more IOPS. For example, SQL Servers storage pool has an IOPS_limit of 2,000 of which 1,998 IOPS are currently being used. This is an example of a storage pool (e.g., S1 204*a*) that the customer may consider purchasing more IOPS (e.g., by selecting the "BUY MORE POOLS" indicator 618). In another example, the Front End Servers storage pool is currently using only 1.3% of its total IOPS limit of 500 IOPS. Front End Servers storage pool may be a candidate for receiving one or more customer virtual machines (e.g., VM_C1 222*a*-VM_Cn 222*n*) from a different storage pool that is near capacity (e.g., a virtual machine in the SQL Servers storage pool), for example. A virtual machine, e.g., SQL_VM_1 of FIG. 5, can be moved from the SQL Servers storage pool 504 to a different storage pool (e.g., Front End Servers) by using the "Move selected VMs to a different pool" indicator 516 depicted in FIG. 5. Referring back to FIG. 6, the Build infrastructure storage pool is using 194 GB of its 200 GB storage space (i.e., its v_size is 200 GB). A customer can select the "BUY MORE GB" indicator 620 to purchase more space. Alternatively or additionally, to purchase more resources for a current storage pool (e.g., SQL Servers, Front End Servers, Build infrastructure, and Skytap Shared Pool), a customer can select the "BUY MORE POOLS" indicator 618 to purchase a new storage pool (not shown) or the "BUY MORE IOPS" indicator 622 to increase the IOPS available to a storage pool (e.g., "SQL Servers," "Front End Servers," "Build infrastructure," or "Skytap Shared Pool").

Figure 7:
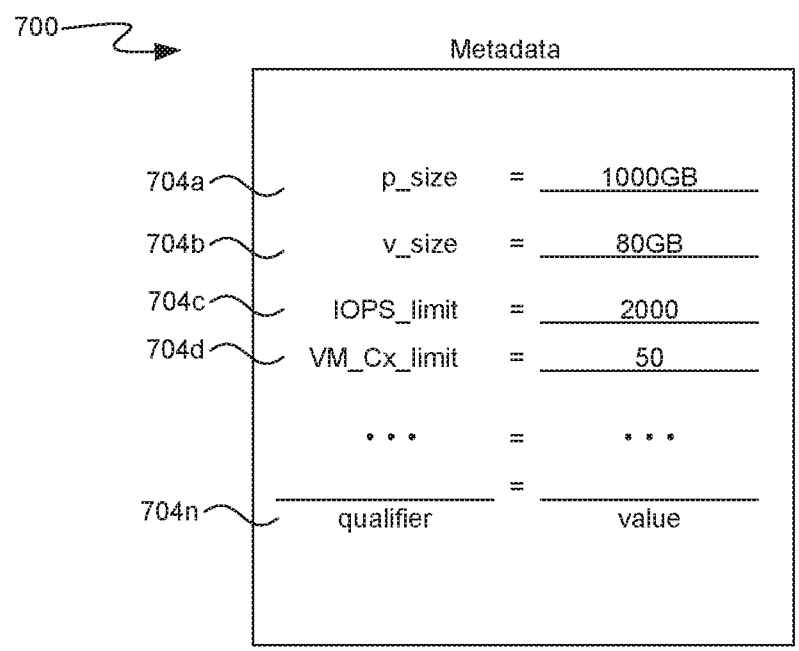
FIG. 7 is an example of metadata in which aspects of the described technology may operate.

FIG. 7 is an example of metadata in which aspects of the described technology may operate. Metadata 700 is data in the form of a record, database entry, text, or other recordable structure that, in some embodiments, is used to implement a VSAN. Metadata 700 includes entries 704a-704n that represent VSAN qualifiers and associated values. For example, metadata qualifiers and values can describe a VSAN, e.g., VSAN1 213, that has a p_size of 1,000 GB, v_size of 80 GB, IOPS_limit of 2,000, and VM_Cx_limit of 50 (i.e., a 50-customer VM limit). In various embodiments and as mentioned above, entries 704a-704n are modified by a VM_SAN (e.g., VM1_SAN 212a), a system operator (e.g., an SAN administrator), or a customer via a GUI (e.g., 400, 500, and/or 600). In one or more embodiments, when one or more entries 704a-704n change, a corresponding change is made to the associated VSAN, e.g., VSAN1 213. For example, if a customer at GUI 400 increases the storage space for DEV_BOX_1 from 80 GB to 100 GB, the described technology will, in various embodiments, reserve the extra 20 GB at the associated storage pool (e.g., S1 204a). In another example, if a customer via GUI 500 decreases the IOPS for SQL_VM_3 from 600 IOPS to 450 IOPS (e.g., by moving the graphical slider), the described technology in various embodiments will provision the VM_SAN (e.g., VM1_SAN 212a) associated with SQL_VM_1 to allocate 150 fewer IOPS to the VSAN (e.g., VSAN1 213). In yet another embodiment, a customer at GUI 600 can select the "BUY MORE POOLS" indicator 618 to cause the described technology to add a new storage pool (e.g., S2 204b).

In general, the detailed description of embodiments of the described technology is not intended to be exhaustive or to limit the technology to the precise form disclosed above. While specific embodiments of, and examples for, the technology are described above for illustrative purposes, various equivalent modifications are possible within the scope of the described technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the described technology provided herein can be applied to other systems, not necessarily the system described herein. The elements and acts of the various embodiments described herein can be combined to provide further embodiments.

These and other changes can be made to the described technology in light of the above Detailed Description. While the above description details certain embodiments of the technology and describes the best mode contemplated, no matter how detailed the above appears in text, the described technology can be practiced in many ways. The described technology may vary considerably in its implementation details, while still being encompassed by the technology disclosed herein. As noted above, particular terminology used when describing certain features or aspects of the described technology should not be taken to imply that the terminology is being redefined herein to be restricted to any specific characteristics, features, or aspects of the technology with which that terminology is associated. In general, the terms used in the following claims should not be construed to limit the described technology to the specific embodiments disclosed in the specification, unless the above Detailed Description section explicitly defines such terms. Accordingly, the actual scope of the described technology encompasses not only the disclosed embodiments, but also all equivalent ways of practicing or implementing the described technology.

We claim:

1. A computer-implemented method, comprising:
for each of a first virtual storage area network and a second virtual storage area network:
receiving metadata defining at least one storage pool configuration and at least one virtual machine configuration:
establishing the virtual storage area network by:
allocating a virtual machine in accordance with the virtual machine configuration defined by the metadata received for the virtual machine:
configuring the allocated virtual machine to represent to other virtual machines as a mass storage device an allocation of data storage at a communicatively-coupled physical block storage device, in accordance with the storage pool configuration specified by the metadata received for the virtual machine: and
booting an operating system of the virtual machine, wherein the operating system is configured based at least on the metadata, wherein the metadata includes an entry for an I/O data rate for sending storage requests from the virtual machine to the storage pool, and wherein a network controller of the virtual machine is configured based on the entry.

2. A computer-implemented method, comprising:
for each of a first virtual storage area network and a second virtual storage area network:
receiving metadata defining at least one storage pool configuration and at least one virtual machine configuration:
establishing the virtual storage area network by:
allocating a virtual machine in accordance with the virtual machine configuration defined by the metadata received for the virtual machine:
configuring the allocated virtual machine to represent to other virtual machines as a mass storage device an allocation of data storage at a communicatively-coupled physical block storage device, in accordance with the storage pool configuration specified by the metadata received for the virtual machine: and
in response to receiving storage access requests at a first I/O data rate, buffering one or more of the storage access requests in a network controller of the virtual machine, wherein at least one of the one or more buffered storage access requests is sent from the virtual machine to the storage pool at a second I/O data rate that is equal to or less than a third I/O data rate defined in the metadata.

3. A computer-implemented method comprising:
for each of a first virtual storage area network and a second virtual storage area network:
receiving metadata defining at least one storage pool configuration and at least one virtual machine configuration;
establishing the virtual storage area network by:
allocating a virtual machine in accordance with the virtual machine configuration defined by the metadata received for the virtual machine;

configuring the allocated virtual machine to represent to other virtual machines as a mass storage device an allocation of data storage at a communicatively-coupled physical block storage device, in accordance with the storage pool configuration specified by the metadata received for the virtual machine; and detecting a change to the metadata, and in response to the detected change, reconfiguring the virtual storage area network based on the detected change.

4. The computer-implemented method of claim 3, wherein the metadata defines a virtual size of the storage pool and a physical size of the storage pool.

5. The computer-implemented method of claim 3, wherein the metadata defines an I/O data rate limit for sending storage block access requests to the storage pool.

6. The computer-implemented method of claim 3, wherein storage block access requests are received at the virtual machine, wherein the virtual machine verifies an I/O data rate associated with the storage block requests, and wherein the storage block requests are sent from the virtual machine to the storage pool at an I/O data rate defined in the metadata.

7. The computer-implemented method of claim 3, wherein storage access requests are sent from a customer's virtual machine for delivery to the storage pool at a first I/O data rate, wherein data in the metadata defines a maximum I/O data rate for sending data to the storage pool, and wherein the first I/O data rate for sending the storage access requests to the storage pool is dynamically modified to an I/O data rate less than or equal to the maximum I/O data rate associated with the storage pool.

8. The computer-implemented method of claim 3, further comprising determining a new virtual storage area network, wherein the new virtual storage area network includes a new virtual machine communicatively coupled to a new storage pool at the physical block storage device.

9. The computer-implemented method of claim 3, further comprising:
booting a commodity operating system of the virtual machine, wherein the commodity operating system is configured based at least on the metadata, and wherein the metadata includes an entry for an I/O data rate for sending storage requests from the virtual machine to the storage pool.

10. The computer-implemented method of claim 3, further comprising:
configuring a network controller of the virtual machine to traffic shape storage requests sent to the one or more storage pools, wherein the traffic shaping is based on the metadata.

11. A virtual storage area network, comprising:
a first virtual machine;
a second virtual machine; and
a storage pool,
wherein the first virtual machine is programmed to:
send data to the storage pool at I/O data rates within an I/O data rate limit defined by metadata associated with the storage pool, by:
receiving one or more storage access requests from the second virtual machine sent by the second virtual machine at a first I/O data rate that is faster than the I/O data rate limit defined in the metadata, and
sending the one or more storage access requests to the storage pool at a second I/O data rate, wherein the second I/O data rate is within the storage pool I/O data rate limit defined by the metadata.

12. The virtual storage area network of claim 11, further comprising:
configuring an operating system of the first virtual machine, wherein configuring the operating system of the first virtual machine includes configuring a network controller of the first virtual machine, and wherein the configured network controller of the first virtual machine dynamically modifies sending the one or more storage access requests to the storage pool at a I/O data rate approximately equal to the I/O data rate limit defined by the metadata.

13. The virtual storage area network of claim 11, further comprising: traffic shaping the one or more storage access requests from operating at the first I/O data rate to operating at the second I/O data rate.

14. The virtual storage area network of claim 11, wherein the first virtual machine receives one or more storage access requests from a third virtual machine for accessing the storage pool, wherein the one or more storage access requests from the third virtual machine were sent at a third I/O data rate, and wherein the sum of the second I/O data rate and the third I/O data rate are greater than the storage pool I/O data rate limit defined by the metadata associated with the storage pool, wherein the one or more storage access requests from the second and the third virtual machines are throttled such that the one or more storage access requests are sent to the storage pool at I/O data rates within the storage pool I/O data rate limit defined by the metadata.

15. The virtual storage area network of claim 11, wherein the metadata defines one or more respective per-virtual machine I/O data rate limits different from and less than the storage pool I/O data rate limit for accessing the storage pool.

16. The virtual storage area network of claim 11, wherein in response to receiving a request to increase an amount of physical block storage space reserved at a physical block storage device for the storage pool, determining within the metadata whether the requested increase is within a maximum storage space limit associated with the storage pool, and reserving the requested increase at the physical block storage device if the increase of the storage space will not exceed the maximum storage space limit.

17. The virtual storage area network of claim 11, wherein the first virtual machine receives a request, via a graphical user interface, to change the storage pool I/O data rate limit for the storage pool, wherein the metadata associated with the storage pool is modified based on the request.

18. The virtual storage area network of claim 11, wherein the first virtual machine automatically decreases a per-virtual machine I/O data rate limit in response to determining that the per-virtual machine I/O data rate is at or near a threshold I/O data rate limit for the storage pool.

19. The virtual storage area network of claim 11, wherein the metadata determines a data storage limit for the storage pool.

20. The virtual storage area network of claim 11, wherein a logical file system is determined for the storage pool and wherein the logical file system includes a dataset for storing data accessible, via a network, to the second virtual machine.

21. A computer-implemented method for determining a virtual storage area network, the computer-implemented method comprising:
determining a virtual space capacity and a physical space capacity for a storage pool, wherein the storage pool is at least an allocation of data storage at a physical block storage device, wherein the physical space capacity determines the physical space reserved at a block storage device for the storage pool, and wherein the virtual space capacity determines an amount of data that a customer can store at the storage pool;

reserving physical block storage space at the physical block storage device for the storage pool, based on the storage pool's physical space capacity; and instantiating a host virtual machine configured to represent the storage pool as a mass storage device to other virtual machines.

22. The computer-implemented method of claim 21, wherein the host virtual machine is configured to forward for delivery to the storage pool one or more storage access requests sent from a virtual machine accessible to a virtual storage area customer.

23. The computer-implemented method of claim 21, wherein the host virtual machine is configured to forward storage access requests at an I/O data rate less than or equal to an I/O data rate limit for accessing the storage pool.

24. The computer-implemented method of claim 21, further comprising, in response to a customer request at a graphical user interface, increasing or decreasing the virtual space capacity for the storage pool by modifying a quota value associated with the storage pool.

25. The computer-implemented method of claim 21, further comprising increasing the storage pool's physical space capacity by determining an additional storage pool at the physical block storage space for the virtual machine, wherein the additional storage pool is detected by the host machine as an additional mass storage device.

26. The computer-implemented method of claim 21, wherein the virtual space capacity is larger than the physical space capacity.

27. A computer-implemented virtual storage area network (VSAN), the computer-implemented VSAN comprising:

in a first virtual machine:
establishing a virtual storage transport connection between the first virtual machine and a physical block storage device;
designating a storage pool at the physical block storage device, wherein a storage pool is an allocation of data blocks for storing data and a logical file system;
representing the storage pool at the physical block storage device as a mass storage device;
exposing the reference to the mass storage device to a network to which the first virtual machine is connected;
receiving, based on the reference, a request from a second virtual machine to perform a block-level operation directed to data on a file system of the mass storage device; and
sending the request, via the virtual storage transport connection, to the physical block storage device for performing the block-level operation on data in the storage pool.

28. The computer-implemented VSAN of claim 27, further comprising configuring the virtual transport connection to limit the rate at which a request is performed.

29. A computer-implemented method for determining a virtual storage area network, the computer-implemented method comprising:

sending data from a first virtual machine to a storage pool at I/O data rates within an I/O data rate limit defined by metadata associated with the storage pool, by:
receiving one or more storage access requests from a second virtual machine sent by the second virtual machine at a first I/O data rate that is faster than the I/O data rate limit defined in the metadata, and
sending the one or more storage access requests to the storage pool at a second I/O data rate, wherein the second I/O data rate is within the storage pool I/O data rate limit defined by the metadata.

30. The computer-implemented method of claim 29, further comprising:
configuring an operating system of the first virtual machine, wherein configuring the operating system of the first virtual machine includes configuring a network controller of the first virtual machine, and wherein the configured network controller of the first virtual machine dynamically modifies sending the one or more storage access requests to the storage pool at a I/O data rate approximately equal to the I/O data rate limit defined by the metadata.

31. The computer-implemented method of claim 29, further comprising: traffic shaping the one or more storage access requests from operating at the first I/O data rate to operating at the second I/O data rate.

32. The computer-implemented method of claim 29, wherein the first virtual machine receives one or more storage access requests from a third virtual machine for accessing the storage pool, wherein the one or more storage access requests from the third virtual machine were sent at a third I/O data rate, and wherein the sum of the second I/O data rate and the third I/O data rate are greater than the storage pool I/O data rate limit defined by the metadata associated with the storage pool, wherein the one or more storage access requests from the second and the third virtual machines are throttled such that the one or more storage access requests are sent to the storage pool at I/O data rates within the storage pool I/O data rate limit defined by the metadata.

33. The computer-implemented method of claim 29, wherein the metadata defines one or more respective per-virtual machine I/O data rate limits different from and less than the storage pool I/O data rate limit for accessing the storage pool.

34. The computer-implemented method of claim 29, wherein in response to receiving a request to increase an amount of physical block storage space reserved at a physical block storage device for the storage pool, determining within the metadata whether the requested increase is within a maximum storage space limit associated with the storage pool, and reserving the requested increase at the physical block storage device if the increase of the storage space will not exceed the maximum storage space limit.

35. The computer-implemented method of claim 29, wherein the first virtual machine receives a request, via a graphical user interface, to change the storage pool I/O data rate limit for the storage pool, wherein the metadata associated with the storage pool is modified based on the request.

36. The computer-implemented method of claim 29, wherein the first virtual machine automatically decreases a per-virtual machine I/O data rate limit in response to determining that the per-virtual machine I/O data rate is at or near a threshold I/O data rate limit for the storage pool.

37. The computer-implemented method of claim 29, wherein the metadata determines a data storage limit for the storage pool.

38. The computer-implemented method of claim 29, wherein a logical file system is determined for the storage pool and wherein the logical file system includes a dataset for storing data accessible, via a network, to the second virtual machine.

39. One or more computer memories collectively storing contents configured to cause a computer system to perform a method for determining a virtual storage area network, the method comprising:

determining a virtual space capacity and a physical space capacity for a storage pool, wherein the storage pool is at least an allocation of data storage at a physical block storage device, wherein the physical space capacity determines the physical space reserved at a block storage device for the storage pool, and wherein the virtual space capacity determines an amount of data that a customer can store at the storage pool;

reserving physical block storage space at the physical block storage device for the storage pool, based on the storage pool's physical space capacity; and instantiating a host virtual machine configured to represent the storage pool as a mass storage device to other virtual machines.

40. The computer memories of claim 39, wherein the host virtual machine is configured to forward for delivery to the storage pool one or more storage access requests sent from a virtual machine accessible to a virtual storage area customer.

41. The computer memories of claim 40, further comprising, in response to a customer request at a graphical user interface, increasing or decreasing the virtual space capacity for the storage pool by modifying a quota value associated with the storage pool.

42. The computer memories of claim 39, wherein the host virtual machine is configured to forward storage access requests at an I/O data rate less than or equal to an I/O data rate limit for accessing the storage pool.

43. The computer memories of claim 39, further comprising increasing the storage pool's physical space capacity by determining an additional storage pool at the physical block storage space for the virtual machine, wherein the additional storage pool is detected by the host machine as an additional mass storage device.

44. The computer memories of claim 39, wherein the virtual space capacity is larger than the physical space capacity.

45. A computer-implemented method for determining a virtual storage area network (VSAN), the computer-implemented method comprising:

in a first virtual machine:

establishing a virtual storage transport connection between the first virtual machine and a physical block storage device;

designating a storage pool at the physical block storage device, wherein a storage pool is an allocation of data blocks for storing data and a logical file system;

representing the storage pool at the physical block storage device as a mass storage device;

exposing the reference to the mass storage device to a network to which the first virtual machine is connected;

receiving, based on the reference, a request from a second virtual machine to perform a block-level operation directed to data on a file system of the mass storage device; and sending the request, via the virtual storage transport connection, to the physical block storage device for performing the block-level operation on data in the storage pool.

46. The computer-implemented method of claim 45, further comprising configuring the virtual transport connection to limit the rate at which a request is performed.

\* \* \* \* \*

UNITED STATES PATENT AND TRADEMARK OFFICE
CERTIFICATE OF CORRECTION

PATENT NO. : 9,798,497 B1  
APPLICATION NO. : 15/177266  
DATED : October 24, 2017  
INVENTOR(S) : Schick et al.

Page 1 of 1

It is certified that error appears in the above-identified patent and that said Letters Patent is hereby corrected as shown below:

In the Claims

In Column 14, Line 10, in Claim 1, delete "network:" and insert -- network; --, therefor.

In Column 14, Lines 12-13, in Claim 1, delete "configuration:" and insert -- configuration; --, therefor.

In Column 14, Line 17, in Claim 1, delete "machine:" and insert -- machine; --, therefor.

In Column 14, Line 24, in Claim 1, delete "machine:" and insert -- machine; --, therefor.

In Column 14, Line 35, in Claim 2, delete "network:" and insert -- network; --, therefor.

In Column 14, Lines 37-38, in Claim 2, delete "configuration:" and insert -- configuration; --, therefor.

In Column 14, Line 42, in Claim 2, delete "machine:" and insert -- machine; --, therefor.

In Column 14, Line 49, in Claim 2, delete "machine:" and insert -- machine; --, therefor.

In Column 14, Line 58, in Claim 3, delete "A" and insert -- The --, therefor.

In Column 14, Line 60, in Claim 3, delete "network:" and insert -- network; --, therefor.

Signed and Sealed this  
Twenty-seventh Day of March, 2018

Andrei Iancu  
*Director of the United States Patent and Trademark Office*